US012542783B2

(12) United States Patent
Shiraishi et al.

(10) Patent No.: US 12,542,783 B2
(45) Date of Patent: Feb. 3, 2026

(54) COMMUNICATION SYSTEM, ANOMALY DETECTION APPARATUS, ANOMALY DETECTION METHOD, AND PROGRAM

(71) Applicant: NTT, Inc., Tokyo (JP)

(72) Inventors: Masahiro Shiraishi, Tokyo (JP); Hiroki Nagayama, Tokyo (JP); Tomoaki Washio, Tokyo (JP); Asami Miyajima, Tokyo (JP)

(73) Assignee: NTT, Inc., Tokyo (JP)

( * ) Notice: Subject to any disclaimer, the term of this patent is extended or adjusted under 35 U.S.C. 154(b) by 162 days.

(21) Appl. No.: 18/551,720

(22) PCT Filed: Apr. 1, 2021

(86) PCT No.: PCT/JP2021/014229
§ 371 (c)(1),
(2) Date: Sep. 21, 2023

(87) PCT Pub. No.: WO2022/208855
PCT Pub. Date: Oct. 6, 2022

(65) Prior Publication Data
US 2024/0056451 A1    Feb. 15, 2024

(51) Int. Cl.
*H04L 9/40* (2022.01)
(52) U.S. Cl.
CPC ........ *H04L 63/101* (2013.01); *H04L 63/1425* (2013.01)
(58) Field of Classification Search
CPC .................................................... H04L 63/101
See application file for complete search history.

(56) References Cited

U.S. PATENT DOCUMENTS

| | | | | |
|---|---|---|---|---|
| 7,882,253 B2* | 2/2011 | Pardo-Castellote | .... | H04L 67/12 709/224 |
| 7,886,180 B2* | 2/2011 | Jin | .......................... | H04L 67/14 709/224 |
| 11,509,654 B2* | 11/2022 | Schmidt | .............. | H04L 63/0884 |
| 2011/0295923 A1* | 12/2011 | de Campos Ruiz | .... | G06F 9/542 709/201 |
| 2011/0307789 A1* | 12/2011 | Karenos | ................. | H04L 41/046 709/230 |
| 2014/0282889 A1* | 9/2014 | Ishaya | ..................... | H04L 63/10 726/4 |
| 2015/0039734 A1* | 2/2015 | King | ................... | H04L 12/1859 709/221 |
| 2015/0097697 A1* | 4/2015 | Laval | ...................... | H04L 69/03 340/870.02 |

(Continued)

OTHER PUBLICATIONS

DDS Foundation "What's in the DDS Standard?", Internet [retrieved on Sep. 20, 2023] (the Internet) <URL: https://www.dds-foundation.org/omg-dds-standard/>.

*Primary Examiner* — Hieu T Hoang
(74) *Attorney, Agent, or Firm* — IPUSA, PLLC

(57) ABSTRACT

A communication system that performs communication among a plurality of nodes by a broker-less type publishing/subscribing model, includes: a computer including a memory and a processor configured to, in a case where a network configuration of the communication system changes, detect an anomaly of the communication system based on configuration information indicating the network configuration and at least one of a predefined white list or black list.

7 Claims, 9 Drawing Sheets

(56) References Cited

U.S. PATENT DOCUMENTS

| | | | |
|---|---|---|---|
| 2016/0050261 A1* | 2/2016 | Mcdaid | H04L 45/302 709/204 |
| 2019/0044976 A1* | 2/2019 | Smith | H04L 67/12 |
| 2021/0286346 A1* | 9/2021 | Braun | G05B 19/41835 |

* cited by examiner

Fig. 5

| | IP RELATIONSHIP LAYER | | PARTICIPANT RELATIONSHIP LAYER | Pub/Sub RELATIONSHIP LAYER | |
|---|---|---|---|---|---|
| | Uni | Multi | Domani | Pub | Sub |
| TREE 1 | 1 | 1 | 1 | 0 | 1 |
| TREE 2 | 1 | 1 | 1 | 0 | 1 |
| TREE 3 | 1 | 1 | 2 | 1 | 1 |
| TREE 4 (SENSOR) | 1 | 1 | 1 | 1 | 0 |
| TREE 5 | 1 | 1 | 1 | 1 | 0 |
| TREE 6 | 1 | 1 | 1 | 1 | 1 |
| TREE 7 | 1 | 1 | 1 | 0 | 1 |
| TREE 8 | 1 | 1 | 1 | 0 | 1 |
| Total | 8 | 8 | 9 | 4 | 6 |

UTILIZATION OF Black List Sub IS IMPOSSIBLE

UTILIZATION OF White List NORMAL VALUES OF TOTAL NUMBERS ARE DEFINED

COMMUNICATION SYSTEM, ANOMALY DETECTION APPARATUS, ANOMALY DETECTION METHOD, AND PROGRAM

TECHNICAL FIELD

The present invention relates to a technology for detecting an anomaly of a communication system that performs Pub/Sub communication.

BACKGROUND ART

In recent years, in order to implement a smart factory, devices on an information network (NW) and devices on a control NW are connected. In the future, a communication model that performs device interconnection and one-to-many, many-to-one communication in a lightweight and flexible manner is expected to be widespread.

A Publish/Subscribe communication (hereinafter, Pub/Sub communication) model has been proposed as a lightweight and flexible communication model as described above. In Pub/Sub communication, there are a Publisher, which is a client on a side on which a message called an event is created and transmitted (distributed), and a Subscriber, which is a client on a side on which the message is received (subscribed).

The Pub/sub communication has three properties of "spatial separation", "temporal separation", and "asynchronous processing". Due to the "spatial separation", the Publisher and the Subscriber do not need to know existence of each other. The "temporal separation" enables transmission and reception of data even in a case where the Publisher and the Subscriber do not exist on the network at the same time. Furthermore, by the "asynchronous processing", transmission and reception of an event can be performed asynchronously with other processing of the Publisher or the Subscriber.

The Pub/Sub communication model includes a broker type and a broker-less type. The configuration of the broker type is a configuration in which functions called a broker responsible for properties of the spatial separation, the temporal separation, and the asynchronous processing is arranged between the Pub and the Sub. The configuration of the broker-less type is a distributed configuration in which all nodes (Pub and Sub) include functions responsible for the properties of the spatial separation, the temporal separation, and the asynchronous processing. By providing a function called data distribution service (DDS) in each of the nodes, the above-described broker-less type configuration can be implemented. Note that the Pub/Sub communication model is also referred to as a publishing/subscribing model.

CITATION LIST

Non-Patent Literature

Non-Patent Literature 1: What's in the DDS Standard, Internet <URL: https://www.dds-foundation.org/omg-dds-standard/>

SUMMARY OF INVENTION

Technical Problem

However, in a communication system that performs Pub/Sub communication using the DDS, wiretapping of the Pub/Sub communication (for example, wiretapping by a node that has unauthorizedly intruded into the NW) cannot be detected. This is because, in a communication system that performs Pub/Sub communication using the DDS, grasping the configuration is difficult, and thus, for example, even if a setting is registered for the purpose of wiretapping multicast distribution, the registration cannot be detected as an anomaly.

The present invention has been made in view of the above points, and an object thereof is to provide a technology that enables detecting an anomaly of a communication system that performs Pub/Sub communication.

Solution to Problem

According to the disclosed technology, a communication system is provided that performs communication among a plurality of nodes by a broker-less type publishing/subscribing model, the communication system including
  a determination unit that, in a case where a network configuration of the communication system changes, detects an anomaly of the communication system based on configuration information indicating the network configuration and at least one of a predefined white list or black list.

Advantageous Effects of Invention

According to the disclosed technology, a technology that enables detecting an anomaly of a communication system that performs Pub/Sub communication is provided.

BRIEF DESCRIPTION OF DRAWINGS

FIG. 5 is a diagram for describing utilization as a WL and utilization as a BL.

DESCRIPTION OF EMBODIMENTS

Hereinafter, an embodiment of the present invention (present embodiment) will be described with reference to the drawings. The embodiment described below is only an example, and an embodiment to which the present invention is applied is not limited to the following embodiment.

In the embodiment described below, an example in which the present invention is applied to a communication system that performs Pub/Sub communication using DDS will be described, but the present invention is applicable not only to the Pub/Sub communication using the DDS.

(Pub/Sub Communication Using DDS)

First, DDS and Pub/Sub communication using the DDS as premises of the present embodiment will be described.

In the present embodiment, the above-described broker-less type configuration is employed, and the DDS includes a function corresponding to a broker, thereby implementing the broker-less type.

Here, delivery range management in the DDS will be described. In the DDS, a delivery NW is added to an NW I/F of a node. A delivery range set by a user is operated by this delivery NW and a filter inside the DDS, and enables transmission and reception of data appropriate for an application functioning as a Pub or a Sub.

Specifically, in the DDS, based on a data bus and the delivery range set by the user, a multicast address is assigned to the NW I/F that can be used in nodes, and the delivery NW is prepared. Whether to perform distribution by unicast using an existing IP address of a node or by a newly assigned multicast address can also be set when the delivery range is designated, and thus a physical data distribution range can be defined.

Figure 1:
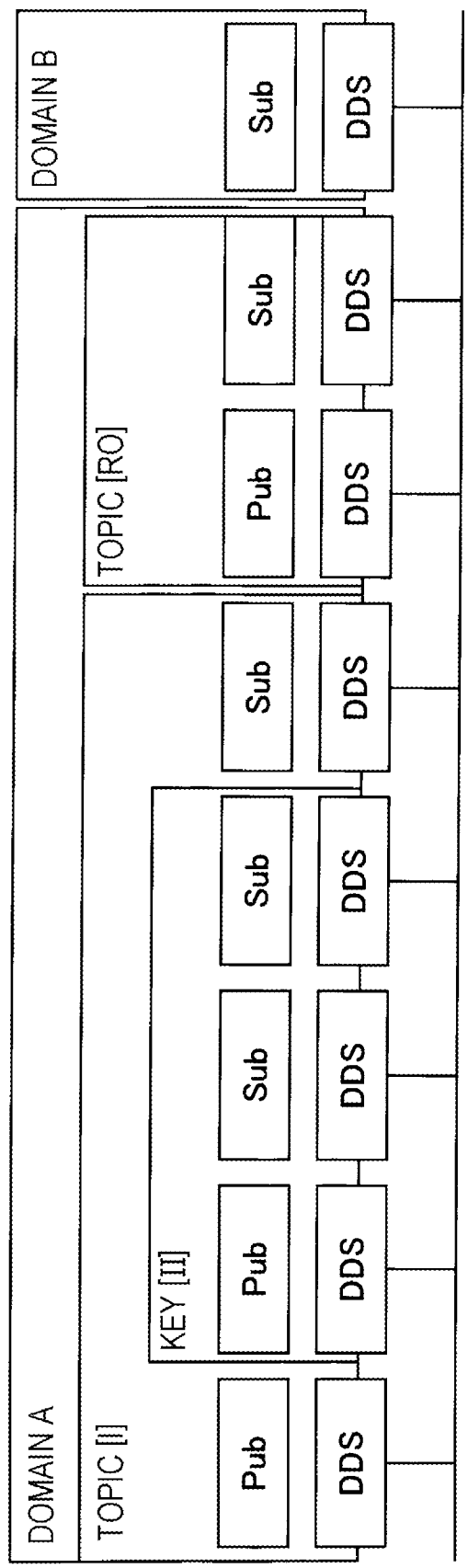
FIG. 1 is a diagram for describing Pub/Sub communication using DDS.

FIG. 1 illustrates an example of delivery ranges. In the example of FIG. 1, a domain A and a domain B are set as the delivery ranges. Furthermore, in the domain A, a delivery range for a topic [i] and a delivery range for a topic [ro] are set. Furthermore, a delivery range of a key [II] is set within the delivery range of the topic [i].

(System Configuration Example in which DDS is Incorporated)

The DDS is a program that functions as middleware in a node (may be referred to as a computer, a communication device, or the like). A processing program as a base necessary for communication in the DDS is prepared as a library. A DDS program can be generated using this library from a data definition file for communication program generation including, as parameters, definitions (type, size, name, QoS, and the like) of data transmitted by an application (described as "APP"). Generation of the DDS itself is an existing technology.

Figure 2:
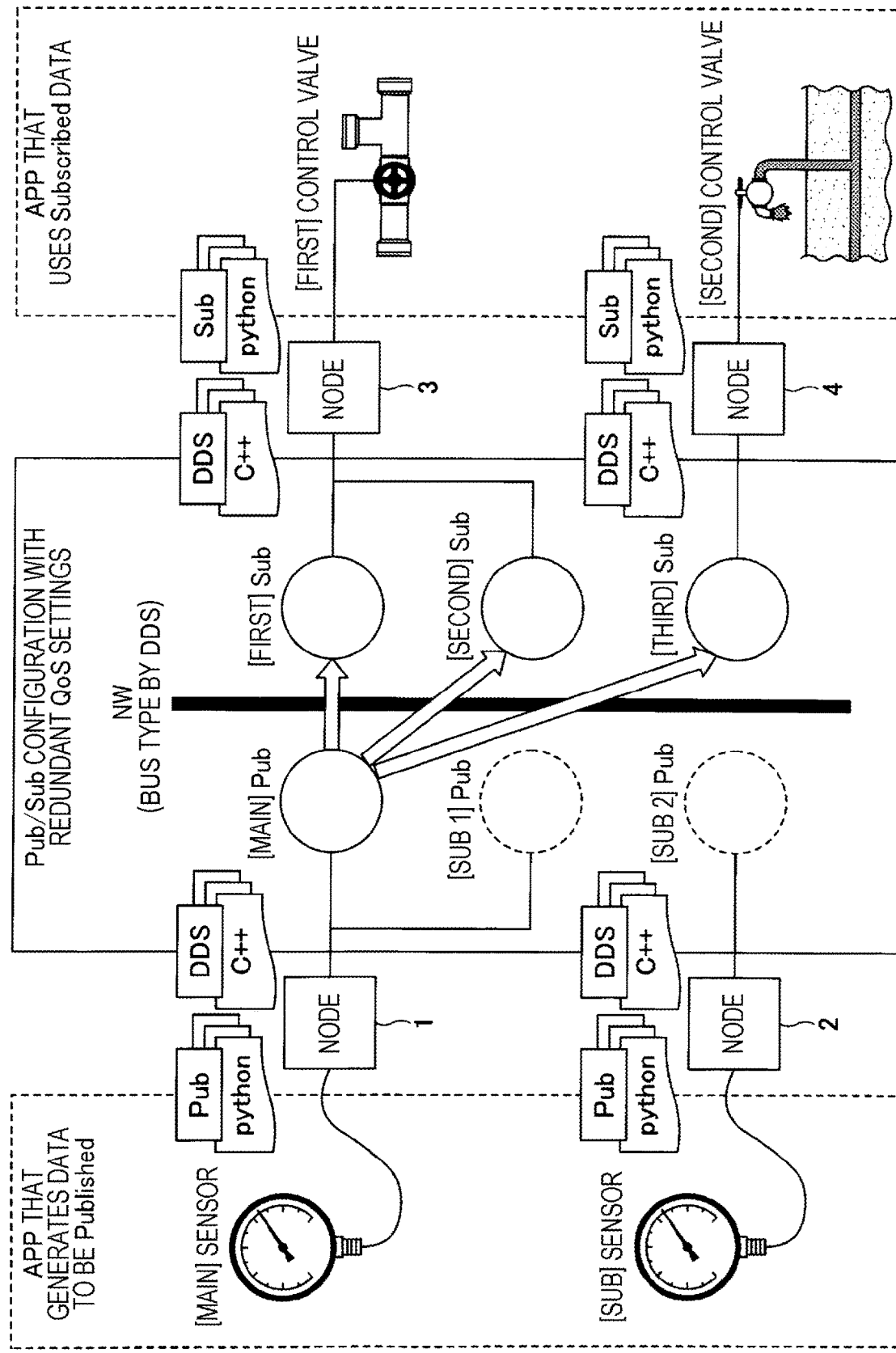
FIG. 2 is a diagram illustrating a system configuration example in which the DDS is incorporated.

FIG. 2 is a diagram illustrating a system configuration example in which the DDS is incorporated. FIG. 2 physically illustrates a configuration in which a plurality of nodes (computers) to which sensors and control valves are connected is connected to a logical bus network.

A sensor is connected to each of nodes 1 and 2, and an APP that generates data to be published and the DDS are mounted on each of the nodes 1 and 2. A control valve is connected to each of nodes 2 and 3, on which an APP that uses subscribed data and the DDS are mounted.

The example of FIG. 2 illustrates an example in which a Pub/Sub configuration with redundant QoS settings is implemented by the DDS. Specifically, the DDS of the node 1 configures a main Pub and a sub 1 Pub, and the DDS of the node 2 configures a sub 2 Pub. Furthermore, the DDS of the node 3 configures a first Sub and a second Sub, and the DDS of the node 4 configures a third Sub.

Note that, in the example of FIG. 2, an example in which APPs are described in python and the DDS is described in C++ is illustrated, but these are merely examples, and the APPs may be described in any program language. Furthermore, in a case where the Pub/Sub configuration is changed, there are changes that can be done partially and dynamically such as QoS, and changes that require restart of a process (including modification of a program).

Hereinafter, an example will be described as an example of the technology according to the present embodiment.

(System Configuration Example in Example)

First, an example of a communication system in the present example will be described. In the communication system in the present example, one node may belong to a plurality of domains. Furthermore, a plurality of Pubs/Subs may exist in one node. Note that, here, the Pub is an application that generates data to be published, and the Sub is an application that uses subscribed data. The functions related to the Pub/Sub communication are performed by the DDS.

Furthermore, both a Pub/Sub may exist in one node, and a Pub/Sub across a plurality of domains may exist in one node. Furthermore, a plurality of Pubs or a plurality of Subs may exist in one APP. Furthermore, the Pubs or the Subs in the same APP can be distinguished from one another. Furthermore, in the communication system in the present example, communication is plain text.

Figure 3:
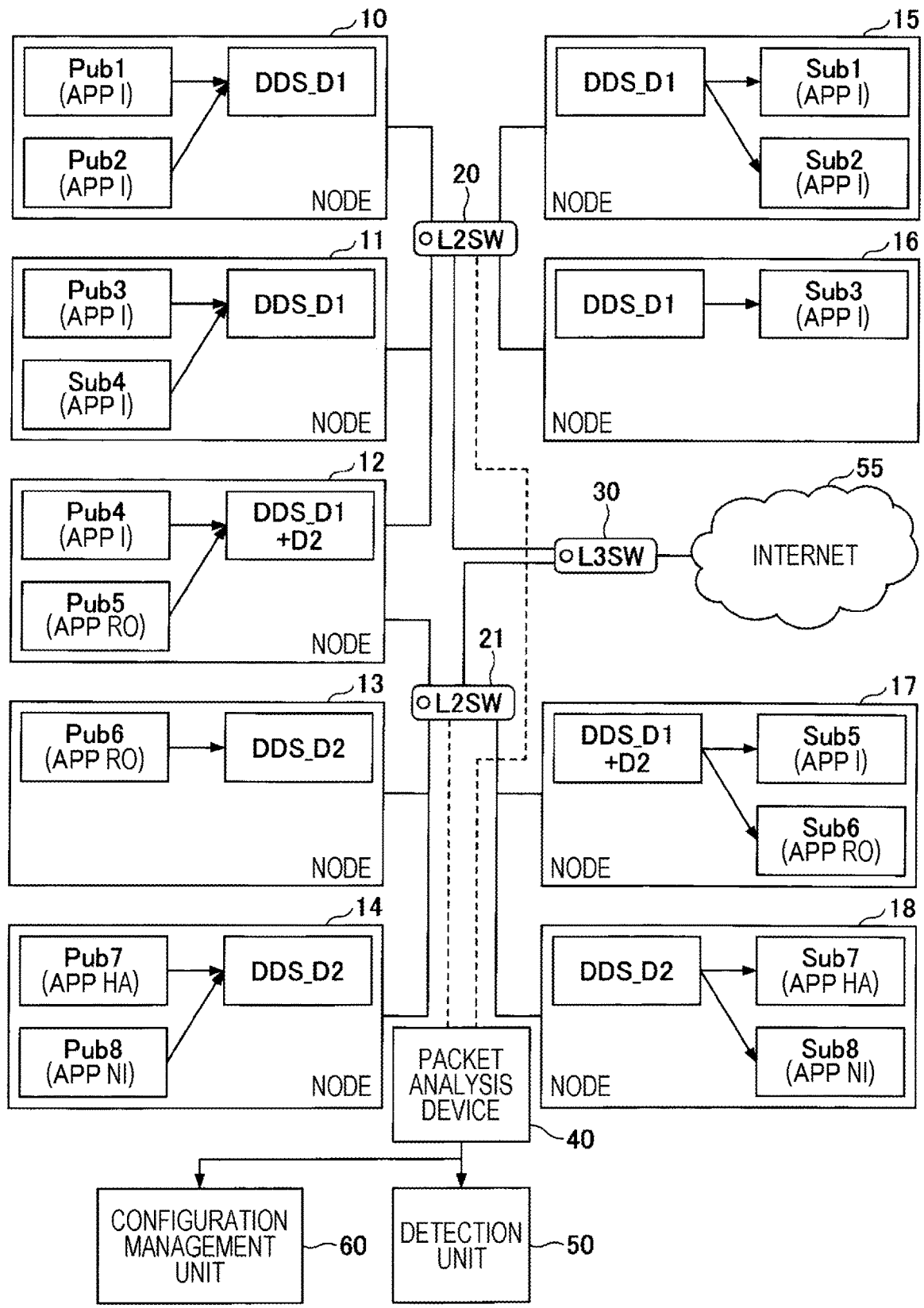
FIG. 3 is a diagram illustrating a system configuration example in an example.

FIG. 3 illustrates a configuration example of the communication system in the present example. As illustrated in FIG. 3, the communication system includes nodes 10 to 18, L2SWs (layer 2 switches) 20 and 21, an L3SW (layer 3 switch) 30, a packet analysis device 40, and a detection unit 50.

In the example of FIG. 3, the nodes 10, 11, 12, 15, 16, and 17 belong to a domain D1, and the nodes 12, 13, 17, and 18 belong to a domain D2. For example, a domain to which a node belongs is indicated as D1 in "DDS D1" of the node 10. The node 12 and the node 17 belong to both the domain D1 and the domain D2.

For example, in the node 10, a "Pub1 (APP i)" is an application for publishing data of a topic [i], and functions as a Pub1 (Publisher1) in the Pub/Sub communication. In the node 10, there are two Pubs of the Pub1 (APP i) and a Pub2 (APP i). This indicates that there is one APP but the function of the DDS enables the one APP to function as the two Pubs. The same applies to a Sub as indicated in the node 15.

Furthermore, the node 11 includes both a Pub and a Sub of a Pub3 and a Sub4. There is a plurality of APPs that functions as a plurality of Pubs in the nodes 12 and 14, and there is a plurality of APPs that functions as a plurality of Subs in the nodes 17 and 18.

Furthermore, the Internet 55 is connected to an end of the L3SW 30, and each node can communicate with the Internet 55. Furthermore, the packet analysis device 40 is connected to the L2SWs 20 and 21, and the detection unit 50 can perform anomaly detection or a configuration management unit 60 can perform configuration management based on a result of packet analysis. Note that the detection unit 50 and the configuration management unit 60 may be included in the packet analysis device 40 or may be included in a device different from the packet analysis device 40. In the present example, it is assumed that the packet analysis device 40 includes the detection unit 50 and the configuration management unit 60.

(Configuration Management)

As described above, in the communication system that performs Pub/Sub communication using the DDS, grasping the configuration (NW configuration) is difficult (that is, managing configuration information of the NW configuration is difficult), and thus wiretapping of the Pub/Sub communication cannot be detected as an anomaly. Therefore, in the present example, configuration information is created by a plurality of items of relationship information that can be created from communication (traffic) flowing among the nodes being combined, and anomaly detection is performed using the configuration information. Hereinafter, a method for creating configuration information will be described.

As the relationship information, three layers of an "IP relationship layer", a "participant relationship layer", and a "Pub/Sub relationship layer" representing topology of the horizontal axis of the NW are created. Since the IP relationship layer and the participant relationship layer are associated with each other and the participant relationship layer and the Pub/Sub relationship layer are associated with each other, all the three layers are eventually associated with each other, and by combining these three layers, a "combined layer" representing topology of the vertical axis of the NW is obtained. Configuration information is managed by holding the combined layer for a plurality of generations. Note that a generation refers to, for example, a division obtained by performing division by a certain time interval, an event interval, or the like.

Figure 4:
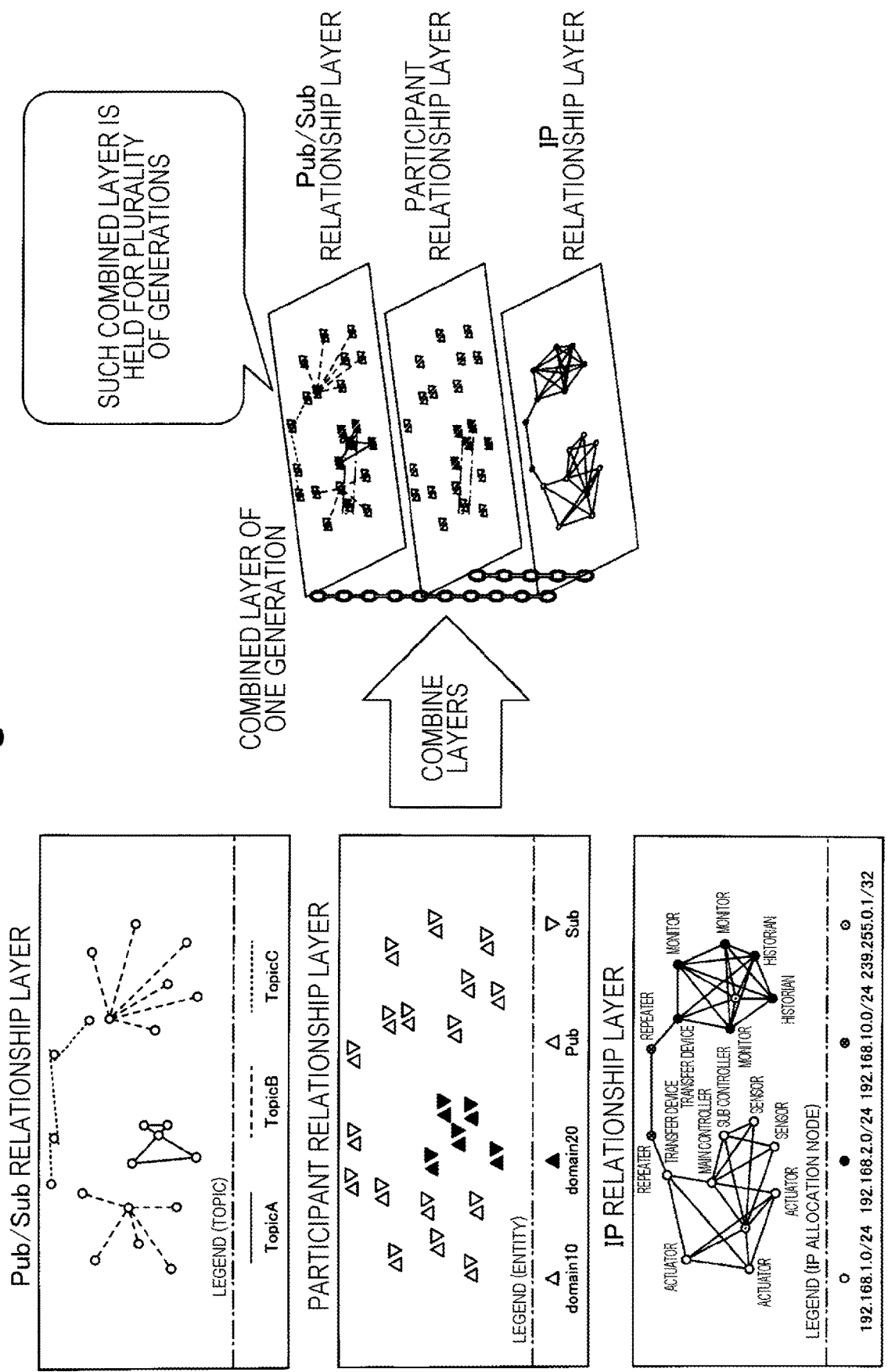
FIG. 4 is a diagram for describing configuration management.

FIG. 4 illustrates an example of the IP relationship layer, the participant relationship layer, the Pub/Sub relationship layer, and the combined layer. As illustrated in FIG. 4, the IP relationship layer is represented by a graph structure in which IP addresses are vertices and transmission and reception relationships of data at an IP level are edges. In the IP relationship layer, in a case where there is an edge between vertices, it indicates that there is a data transmission and reception relationship between nodes including IP addresses represented by the vertices. Note that one node may have a plurality of IP addresses (for example, an IP address for multicast may be included in addition to an IP address for unicast). The participant relationship layer represents a globally unique identifier (GUID) of a node using one symbol (triangular or inverted triangular symbol), and each symbol represents whether the domain to which each GUID belongs is a Pub or a Sub. The Pub/Sub relationship layer includes GUIDs of the nodes as vertices and relationships of whether the nodes belong to the same topics as edges, and represents relationships of topics to which the GUIDs belong. Note that the participant relationship layer is also represented by a graph structure including the above symbols (triangular or inverted triangular symbols) as vertices. In the example of FIG. 4, there is no edge in the graph structure representing the participant relationship layer, but for example, vertices belonging to the same domains may be connected by edges.

The Pub/Sub relationship layer can be created using information acquired from communication as data distribution, and the participant relationship layer can be created using information acquired from communication for DDS operation. Meanwhile, the IP relationship layer can be created using information acquired from both communication as data distribution and communication for DDS operation. Note that the communication for DDS operation is communication performed in a case where a node participates in the Pub/Sub communication; communication performed in a case where another node is searched for; communication performed in a case where distribution contents are agreed; and the like.

In the IP relationship layer, one vertex is associated with a 5-tuple including an IP address of a node (src/dst IP addresses, src/dst port numbers, protocol number). In the participant relationship layer, a GUID and a port number are associated with one symbol (triangular or inverted triangular symbol). In the Pub/Sub relationship layer, a GUID and a topic name are associated with one vertex. The GUID is an identifier used in the DDS, and is generated from an IP address, a port number, and the like. Note that one node may include a plurality of GUIDs (for example, in a case where one node functions as both a Pub and a Sub; in a case where one node belongs to a plurality of domains or a plurality of topics; and the like).

Therefore, the IP relationship layer can be associated with the participant relationship layer using port numbers, and the participant relationship layer can be associated with the Pub/Sub relationship layer using GUIDs. By combining the three layers being combined by these associations, the combined layer is obtained as the NW configuration information of the communication system that performs Pub/Sub communication. This combined layer is held, for example, for a plurality of generations.

Here, in a case of focusing on one node in the combined layer, one or more vertices of the IP relationship layer (5-tuple including IP addresses) correspond to this node, and one or more vertices of the participant relationship layer (port numbers and GUIDs) are associated with the one or more vertices. Furthermore, zero or more vertices of the Pub/Sub relationship layer (GUIDs and topic names) are associated with the one or more vertices of the participant relationship layer. That is, in the combined layer, for each node, a tree structure having the node as a vertex (a tree structure in which the highest hierarchy level represents the IP address, the next hierarchy level represents the port number, the next hierarchy level represent the GUID, and the lowest hierarchy level represents the topic name) is obtained, and the tree structure represents vertical axis topology.

However, setting the layers in FIG. 4 as the configuration information is an example, and any information can be used as the configuration information as long as horizontal axis and vertical axis topology of the NW can be expressed.

(Anomaly Detection)

A method for detecting an anomaly using the above configuration information will be described. Note that an anomaly in the present example means unauthorized participation for the purpose of wiretapping. For example, acts of unauthorizedly participating in a multicast group to wiretap multicast distribution, transmitting unauthorized packets into a communication system at the IP level, having a malicious application intrude into an authorized node to perform unauthorized subscription, and the like are targets of anomaly detection.

In the present example, focusing on the horizontal axis and vertical axis topology of the above configuration information (combined layer), the topology is compared with a predefined white list (WL) and black list (BL) so as to detect an anomaly.

For example, it is assumed that trees illustrated in FIG. 5 are obtained in the normal time in a case where the number of nodes is eight. In FIG. 5, "Uni" represents the number of unicast addresses, "Multi" represents the number of multicast addresses, "Domain" represents the number of domains, "Pub" represents the number of Pubs, and "Sub" represents the number of Subs. For example, a tree 1 includes Uni=1, Multi=1, Domain=1, Pub=0, and Sub=1. This means that a node corresponding to the tree 1 includes one unicast address and one multicast address, belongs to one domain, and functions as one Sub.

At this time, for example, a BL for a tree 4 is defined as "the number of Subs is not 0". This is because a node corresponding to the tree 4 functions only as a Pub that distributes sensor data and does not function as a Sub. Furthermore, for example, WL is defined as "the total amount of Unis, Multis, Domains, Pubs, and Subs". In this manner, WL and BL can be defined utilizing the combined layer in the normal time (configuration information).

However, the above definitions of the WL and BL are merely examples, and various definition are possible when normality and anomaly of the communication system or the nodes are defined as a WL and a BL, respectively. An example will be described below.

Definition example of a WL: "the number of vertices of the IP relationship layer"≤"the number of vertices of the Pub/Sub relationship layer"

The above definition example of a WL is an example in which the total amount in the normal time is defined focusing on the horizontal axis topology.

Definition example of a BL: the belonging domain of a node A is a domain B

The above definition example of a BL is an example in which a case where a certain node belongs to a certain domain is defined as an anomaly focusing on the vertical axis topology.

Configuration Example of Present Example

In the present example, a mechanism for performing the above-described anomaly detection is provided.

Figure 6:
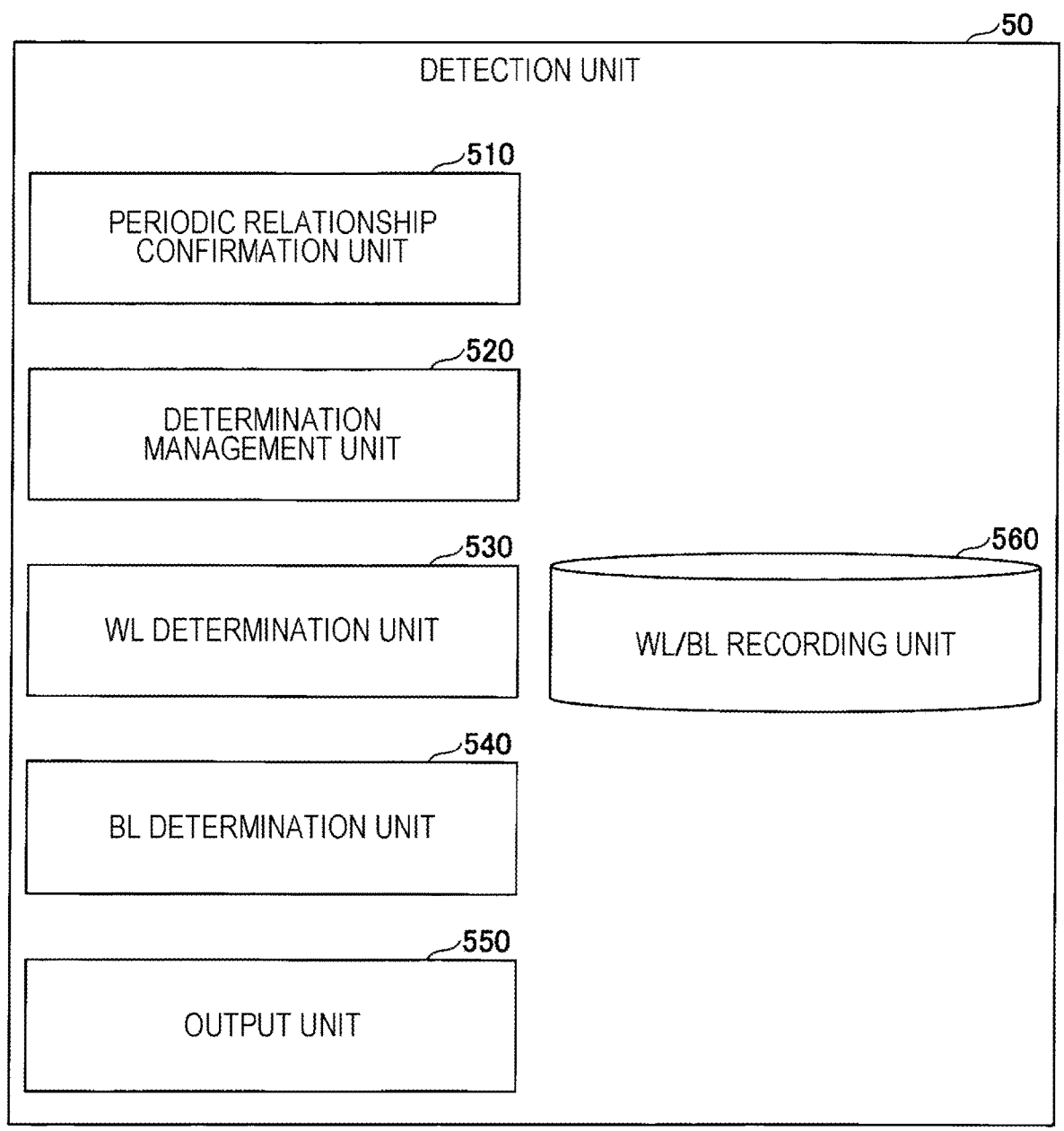
FIG. 6 is a diagram illustrating a configuration example of a detection unit in the example.

FIG. 6 illustrates a configuration example of the detection unit 50. As illustrated in FIG. 6, the detection unit 50 includes a periodic relationship confirmation unit 510, a determination management unit 520, a WL determination unit 530, a BL determination unit 540, and an output unit 550. Operations of each unit will be described in a sequence to be described below. Furthermore, the detection unit 50 includes a WL/BL recording unit 560 in which a WL and a BL are recorded. Note that it is assumed that the WL and the BL are created in advance and recorded in the WL/BL recording unit 560.

Figure 7:
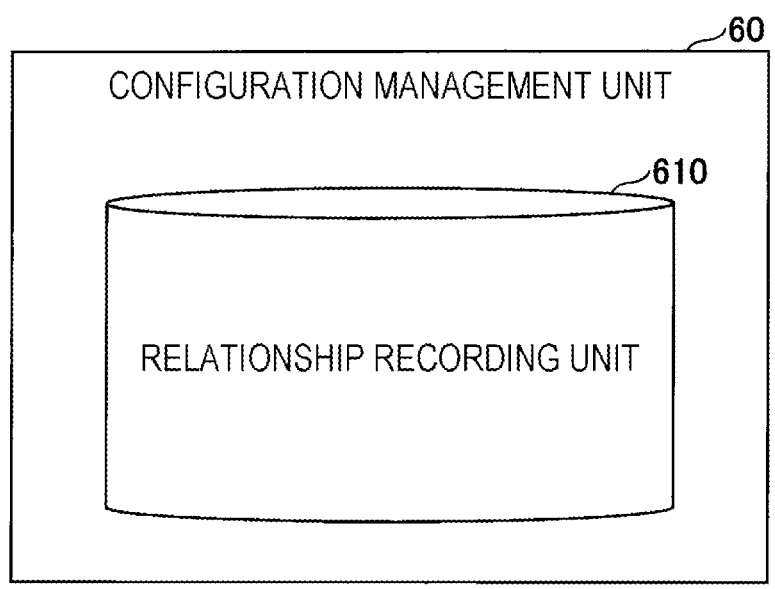
FIG. 7 is a diagram illustrating a configuration example of a configuration management unit in the example.

FIG. 7 illustrates a configuration example of the configuration management unit 60. As illustrated in FIG. 7, the configuration management unit 60 includes a relationship recording unit 610 in which configuration information of a plurality of generations (IP relationship layers, participant relationship layers, Pub/Sub relationship layers, and combined layers) is recorded. Note that it is assumed that the configuration information is created in advance and recorded in the relationship recording unit 610.

In the present example, anomaly detection is performed by the above-described units using the configuration information, the WL, and the BL. Accordingly, an unauthorized act such as wiretapping in a communication system that performs Pub/Sub communication can be detected as an anomaly.

Sequence Example of Present Example

Figure 8:
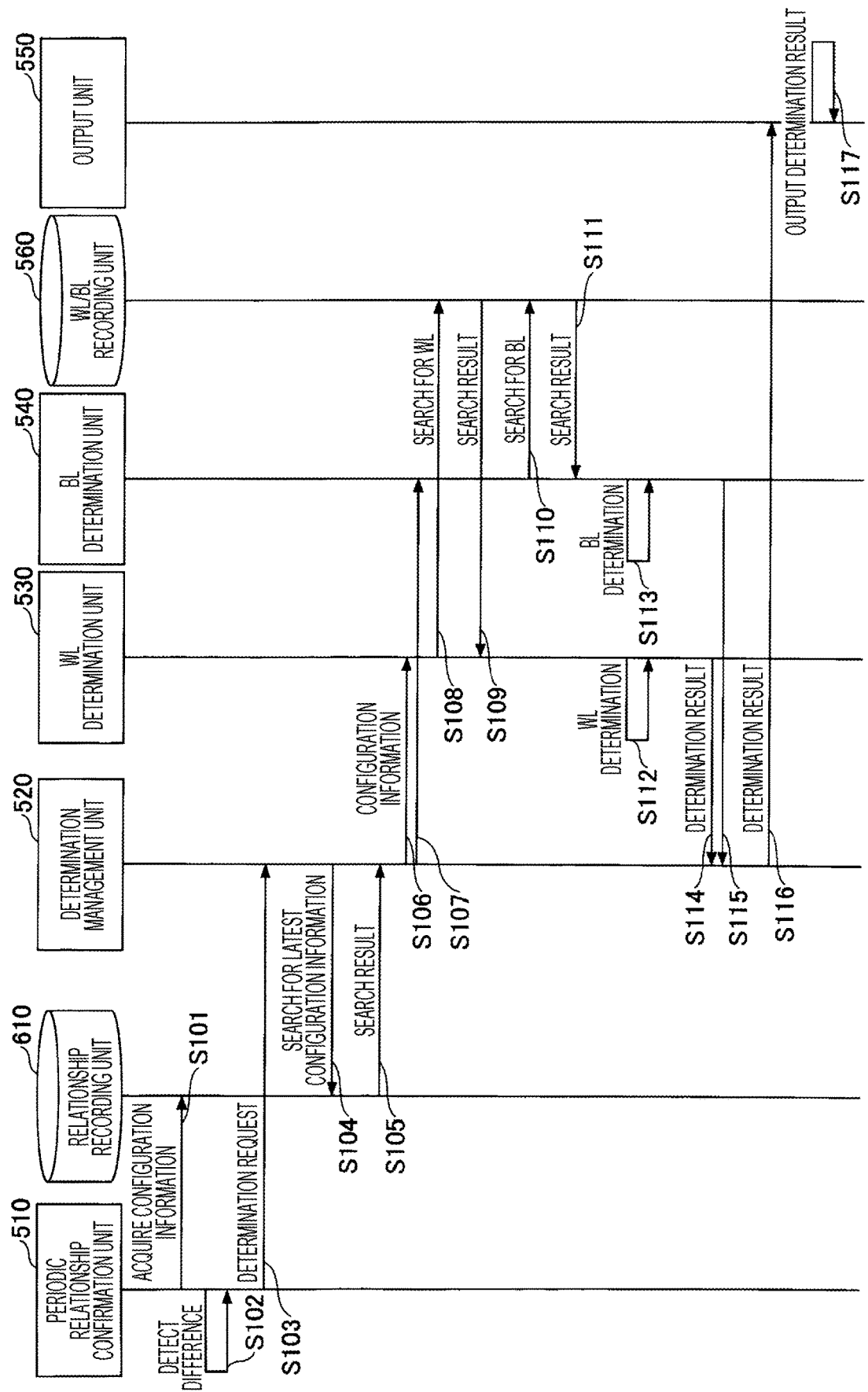
FIG. 8 is a diagram illustrating a processing flow in the example.

Next, an example operations of the packet analysis device 40 including the detection unit 50 and the configuration management unit 60 in the present example will be described with reference to a sequence diagram of FIG. 8.

The periodic relationship confirmation unit 510 periodically acquires configuration information from the relationship recording unit 610 and detects a difference among generations (S101 to S102). In a case where a difference in the configuration information is not detected among the generations, the processing ends without processing anything. On the other hand, in a case where a difference is detected, the periodic relationship confirmation unit 510 transmits a determination request to the determination management unit 520 (S103). Note that, in this difference detection, a difference among the configuration information of all the generations may be detected, or a difference between configuration information of a latest generation and configuration information of a generation previous to the latest generation may be detected.

The determination management unit 520 that has received the determination request searches the relationship recording unit 610 for the configuration information of the latest generation, and acquires the configuration information of the latest generation as a search result (S104 to S105). Then, the determination management unit 520 transmits the acquired configuration information to the WL determination unit 530 and the BL determination unit 540 (S106 to S107).

The WL determination unit 530 searches in the WL/BL recording unit 560 for a WL, and acquires the WL as a search result (S108 to S109). Similarly, the BL determination unit 540 searches in the WL/BL recording unit 560 for a BL, and acquires the BL as a search result (S110 to S111).

Next, the WL determination unit 530 determines presence or absence of an anomaly using the acquired configuration information and WL (S112). Similarly, the BL determination unit 540 determines presence or absence of an anomaly using the acquired configuration information and BL (S113). Thereafter, the WL determination unit 530 and the BL determination unit 540 transmit determination results to the determination management unit 520 (S114 to S115). Note that both the WL and the BL are determined in the present example, but only one of the WL and the BL may be determined.

Subsequently, the determination management unit 520 transmits the determination results received from the WL determination unit 530 and the BL determination unit 540 to the output unit 550 (S116). The output unit 550 outputs the determination results received from the determination management unit 520 (S117). Accordingly, the determination results indicating normality or anomaly are output. Note that the output destination of the determination results may be any destination, and for example, it is conceivable to set a terminal used by an operator or the like monitoring the communication network as the output destination.

Hardware Configuration Example

The packet analysis device 40 including the detection unit 50 and the configuration management unit 60 in the present embodiment can be implemented, for example, by causing a computer to perform a program in which the processing contents described in the present embodiment are described.

The above program may be recorded in a computer-readable recording medium (such as a portable memory) to be stored and distributed. Also, the program may be provided through a network such as the Internet or an electronic mail.

Figure 9:
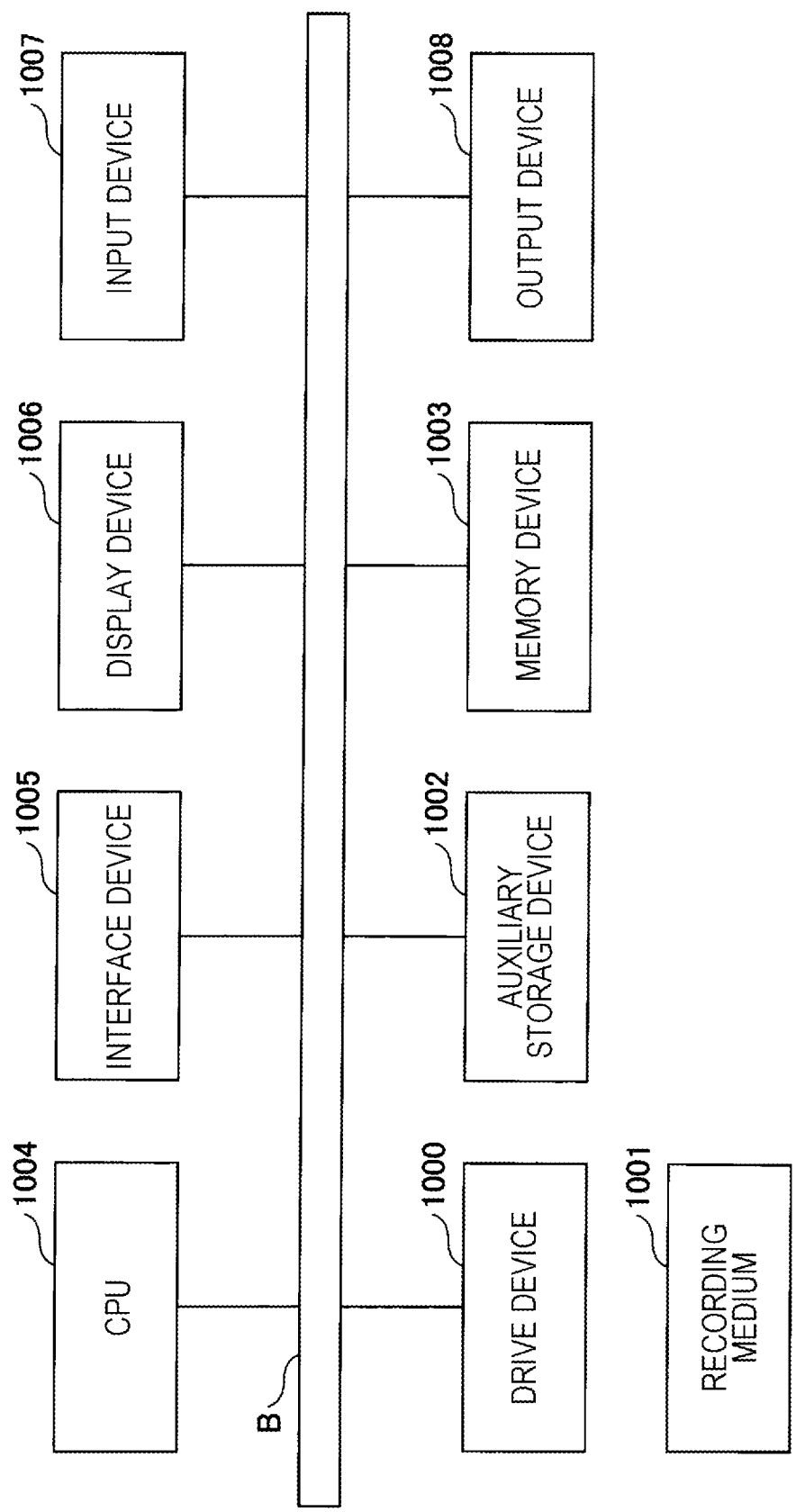
FIG. 9 is a diagram illustrating a hardware configuration example of devices.

FIG. 9 is a diagram illustrating a hardware configuration example of the above computer. The computer of FIG. 9 includes a drive device 1000, an auxiliary storage device 1002, a memory device 1003, a CPU 1004, an interface device 1005, a display device 1006, an input device 1007, an output device 1008, and the like, which are connected to each other by a bus B.

The program for performing processes in the computer is provided through a recording medium 1001 such as a CD-ROM or a memory card, for example. When the recording medium 1001 that stores the program is set in the drive device 1000, the program is installed from the recording medium 1001 into the auxiliary storage device 1002 via the drive device 1000. However, the program is not necessarily installed from the recording medium 1001, and may be downloaded from another computer via a network. The auxiliary storage device 1002 stores the installed program, and also stores necessary files, data, and the like.

In a case where an instruction to start the program is issued, the memory device 1003 reads the program from the auxiliary storage device 1002, and stores the program therein. The CPU 1004 implements functions related to the detection unit 50 and the configuration management unit 60 according to the program stored in the memory device 1003. The interface device 1005 is used as an interface for connection to the network. The display device 1006 displays a graphical user interface (GUI) or the like according to the program. The input device 1007 includes a keyboard and a mouse, buttons, a touch panel, or the like, and is used to input various operation instructions. The output device 1008 outputs a calculation result. Note that the packet analysis device 40 may not include either or both of the display device 1006 and the input device 1007.

Effect of Embodiment

According to the technology of the present embodiment, an anomaly of a communication system that performs Pub/Sub communication using DDS can be detected.

Summary of Embodiment

The present description discloses at least a communication system, a communication device, an anomaly detection apparatus, an anomaly detection method, and a program in the following clauses.

(Clause 1)

A communication system that performs communication among a plurality of nodes by a broker-less type publishing/subscribing model, the communication system including
a determination unit that, in a case where a network configuration of the communication system changes, detects an anomaly of the communication system based on configuration information indicating the network configuration and at least one of a predefined white list or black list.

(Clause 2)

The communication system according to the clause 1,
in which the configuration information is
information in which, using first relationship information indicating a relationship among the nodes regarding transmission and reception of the communication, second relationship information indicating a relationship among the nodes regarding a belonging domain and whether the nodes are on a publisher side or on a subscriber side, and third relationship information indicating a relationship among the nodes regarding a topic to be published and subscribed, the first relationship information and the second relationship information are associated with each other by IP addresses and port numbers, and the second relationship information and the third relationship information are associated with each other by identifiers used in the publishing/subscribing model.

(Clause 3)

The communication system according to the clause 2,
in which the white list is
information in which a condition for determining normality is defined for a tree represented by one or more IP addresses held by each of the nodes, one or more port numbers corresponding to the IP addresses, identifiers corresponding to the IP addresses and the port numbers, and topic names corresponding to the identifiers,
the black list is
information in which a condition for determining an anomaly is defined for a tree represented by one or more IP addresses held by each of the nodes, one or more port numbers corresponding to the IP addresses, identifiers corresponding to the IP addresses and the port numbers, and topic names corresponding to the identifiers, and
the determination unit detects an anomaly of the communication system by determining an anomaly of the communication system based on the configuration information and at least one of the white list or the black list.

(Clause 4)

An anomaly detection apparatus that detects an anomaly of a communication system that performs communication among a plurality of nodes by a broker-less type publishing/subscribing model, the anomaly detection apparatus including
a determination unit that, in a case where a network configuration of the communication system changes, detects an anomaly of the communication system based on configuration information indicating the network configuration and at least one of a predefined white list or black list.

(Clause 5)

The anomaly detection apparatus according to the clause 4,
in which the configuration information is
information in which, using first relationship information indicating a relationship among the nodes regarding transmission and reception of the communication, second relationship information indicating a relationship among the nodes regarding a belonging domain and whether the nodes are on a publisher side or on a subscriber side, and third relationship information indicating a relationship among the nodes regarding a topic to be published and subscribed, the first relationship information and the second relationship information are associated with each other by IP addresses and port numbers, and the second relationship information and the third relationship information are associated with each other by identifiers used in the publishing/subscribing model.

(Clause 6)

The anomaly detection apparatus according to the clause 5,
in which the white list is
information in which a condition for determining normality is defined for a tree represented by one or more IP addresses held by each of the nodes, one or more port numbers corresponding to the IP addresses, identifiers corresponding to the IP addresses and the port numbers, and topic names corresponding to the identifiers,
the black list is
information in which a condition for determining an anomaly is defined for a tree represented by one or more IP addresses held by each of the nodes, one or more port numbers corresponding to the IP addresses, identifiers corresponding to the IP addresses and the port numbers, and topic names corresponding to the identifiers, and
the determination unit detects an anomaly of the communication system by determining an anomaly of the communication system based on the configuration information and at least one of the white list or the black list.

(Clause 7)

An anomaly detection method performed by an anomaly detection apparatus that detects an anomaly of a communication system that performs communication among a plurality of nodes by a broker-less type publishing/subscribing model, the anomaly detection method including
a determination step for, in a case where a network configuration of the communication system changes, detecting an anomaly of the communication system based on configuration information indicating the network configuration and at least one of a predefined white list or black list.

(Clause 8)

A program causing a computer to function as the anomaly detection apparatus according to any one of clauses 4 to 6.

Although the present embodiment has been described above, the present invention is not limited to such a specific embodiment, and various modifications and changes can be made within the scope of the present invention disclosed in the claims.

REFERENCE SIGNS LIST 10 to 18 Node
20, 21 L2SW
L3SW
40 Packet analysis device
50 Detection unit
55 Internet
60 Configuration management unit
510 Periodic relationship confirmation unit
520 Determination management unit
530 WL determination unit
540 BL determination unit
550 Output unit
560 WL/BL recording unit
610 Relationship recording unit
1000 Drive device
1001 Recording medium
1002 Auxiliary storage device
1003 Memory device
1004 CPU
1005 Interface device
1006 Display device
1007 Input device
1008 Output device

The invention claimed is:

1. A communication system that performs communication among a plurality of nodes by a broker-less type publishing/subscribing model, the communication system comprising:
a computer including a memory and a processor configured to
in a case where a network configuration of the communication system changes, detect an anomaly of the communication system based on configuration information indicating the network configuration and at least one of a predefined white list or black list,
wherein the configuration information comprises multi-level relationship information between nodes extracted from communication traffic in the broker-less type publishing/subscribing model, and
the communication system further comprises a configuration management unit configured to perform network configuration control in response to detection of the anomaly,
wherein the configuration information is information in which, using first relationship information indicating a relationship among the nodes regarding transmission and reception of the communication, second relationship information indicating a relationship among the nodes regarding a belonging domain and whether the nodes are on a publisher side or on a subscriber side, and third relationship information indicating a relationship among the nodes regarding a topic to be published and subscribed, the first relationship information and the second relationship information are associated with each other by IP addresses and port numbers, and the second relationship information and the third relationship information are associated with each other by identifiers used in the broker-less type publishing/subscribing model.

2. The communication system according to claim 1, wherein the white list is information in which a condition for determining a normality is defined for a tree represented by one or more IP addresses held by each of the nodes, one or more port numbers corresponding to the IP addresses, identifiers corresponding to the IP addresses and the port numbers, and topic names corresponding to the identifiers,
the black list is information in which a condition for determining an anomaly is defined for a tree represented by one or more IP addresses held by each of the nodes, one or more port numbers corresponding to the IP addresses, identifiers corresponding to the IP addresses and the port numbers, and topic names corresponding to the identifiers, and
the processor detects an anomaly of the communication system by determining an anomaly of the communication system based on the configuration information and at least one of the white list or the black list.

3. An anomaly detection apparatus that detects an anomaly of a communication system that performs communication among a plurality of nodes by a broker-less type publishing/subscribing model, the anomaly detection apparatus comprising:
a memory; and
a processor configured to
in a case where a network configuration of the communication system changes, detect an anomaly of the communication system based on configuration information indicating the network configuration and at least one of a predefined white list or black list,
wherein the configuration information comprises multi-level relationship information between nodes extracted from communication traffic in the broker-less type publishing/subscribing model, and
the communication system comprises a configuration management unit configured to perform network configuration control in response to detection of the anomaly,
wherein the configuration information is information in which, using first relationship information indicating a relationship among the nodes regarding transmission and reception of the communication, second relationship information indicating a relationship among the nodes regarding a belonging domain and whether the nodes are on a publisher side or on a subscriber side, and third relationship information indicating a relationship among the nodes regarding a topic to be published and subscribed, the first relationship information and the second relationship information are associated with each other by IP addresses and port numbers, and the second relationship information and the third relationship information are associated with each other by identifiers used in the broker-less type publishing/subscribing model.

4. The anomaly detection apparatus according to claim 3, wherein the configuration information is information in which, using first relationship information indicating a relationship among the nodes regarding transmission and reception of the communication, second relationship information indicating a relationship among the nodes regarding a belonging domain and whether the nodes are on a publisher side or on a subscriber side, and third relationship information indicating a relationship among the nodes regarding a topic to be published and subscribed, the first relationship information and the second relationship information are associated with each other by IP addresses and port numbers, and the second relationship information and the third relationship information are associated with each other by identifiers used in the broker-less type publishing/subscribing model.

5. The anomaly detection apparatus according to claim 4, wherein the white list is information in which a condition for determining a normality is defined for a tree represented by one or more IP addresses held by each of the nodes, one or more port numbers corresponding to the IP addresses, identifiers corresponding to the IP addresses and the port numbers, and topic names corresponding to the identifiers, the black list is information in which a condition for determining an anomaly is defined for a tree represented by one or more IP addresses held by each of the nodes, one or more port numbers corresponding to the IP addresses, identifiers corresponding to the IP addresses and the port numbers, and topic names corresponding to the identifiers, and the processor detects an anomaly of the communication system by determining an anomaly of the communication system based on the configuration information and at least one of the white list or the black list.

6. An anomaly detection method performed by an anomaly detection apparatus that includes a memory and a processor to detect an anomaly of a communication system that performs communication among a plurality of nodes by a broker-less type publishing/subscribing model, the anomaly detection method comprising:

in a case where a network configuration of the communication system changes, detecting an anomaly of the communication system based on configuration information indicating the network configuration and at least one of a predefined white list or black list, wherein the configuration information comprises multi-level relationship information between nodes extracted from communication traffic in the broker-less type publishing/subscribing model, and the anomaly detection method further comprises performing, by the communication system including a configuration management unit, network configuration control in response to detection of the anomaly, wherein the configuration information is information in which, using first relationship information indicating a relationship among the nodes regarding transmission and reception of the communication, second relationship information indicating a relationship among the nodes regarding a belonging domain and whether the nodes are on a publisher side or on a subscriber side, and third relationship information indicating a relationship among the nodes regarding a topic to be published and subscribed, the first relationship information and the second relationship information are associated with each other by IP addresses and port numbers, and the second relationship information and the third relationship information are associated with each other by identifiers used in the broker-less type publishing/subscribing model.

7. A non-transitory computer-readable recording medium having computer-readable instructions stored thereon, which, when executed, cause a computer including a memory and processor to function as the anomaly detection apparatus according to claim 3.

* * * * *